United States Patent
Kaneko et al.

(10) Patent No.: US 10,629,326 B2
(45) Date of Patent: *Apr. 21, 2020

(54) CONDUCTIVE POLYMER MATERIAL AND MOLDED ARTICLE USING SAME

(71) Applicant: Denka Company Limited, Chuo-ku, Tokyo (JP)

(72) Inventors: Hitoshi Kaneko, Machida (JP); Toru Arai, Chuo-ku (JP); Yoko Horikoshi, Machida (JP); Ayumu Tsukamoto, Machida (JP); Akira Miyama, Machida (JP)

(73) Assignee: Denka Company Limited, Chuo-ku, Tokyo (JP)

( * ) Notice: Subject to any disclaimer, the term of this patent is extended or adjusted under 35 U.S.C. 154(b) by 131 days.

This patent is subject to a terminal disclaimer.

(21) Appl. No.: 15/501,800

(22) PCT Filed: Aug. 6, 2015

(86) PCT No.: PCT/JP2015/072302
§ 371 (c)(1),
(2) Date: Feb. 3, 2017

(87) PCT Pub. No.: WO2016/021672
PCT Pub. Date: Feb. 11, 2016

(65) Prior Publication Data
US 2017/0365372 A1     Dec. 21, 2017

(30) Foreign Application Priority Data
Aug. 7, 2014   (JP) .................................. 2014-161202

(51) Int. Cl.
*H01B 1/24*    (2006.01)
*C08K 3/00*    (2018.01)
(Continued)

(52) U.S. Cl.
CPC ............... *H01B 1/24* (2013.01); *C08K 3/041* (2017.05); *C08K 3/046* (2017.05); *C08L 33/10* (2013.01);
(Continued)

(58) Field of Classification Search
CPC .......... H01B 1/24; C08L 101/12; C08K 3/04; C01B 32/15
See application file for complete search history.

(56) References Cited

U.S. PATENT DOCUMENTS 9,738,993 B2 *  8/2017  Kaneko ................... B01J 21/10
2011/0003151 A1  1/2011  Nishio et al.
(Continued)

FOREIGN PATENT DOCUMENTS

JP    2007-231089 A    9/2007
JP    2008-138040 A    6/2008
(Continued)

OTHER PUBLICATIONS

Staudinger et al "Dispersability of multiwalled carbon nanotubes in polycarbonate chloroform solutions", Polymer 55 (2014) 6335-6344. (Year: 2014).*
(Continued)

*Primary Examiner* — Mark Kopec
(74) *Attorney, Agent, or Firm* — Christensen O'Connor Johnson Kindness PLLC

(57) ABSTRACT

By using CNF excellent in dispersibility, conductivity, and crystallinity, a conductive polymer material having high conductivity even with a low CNF content and a shaped article thereof and a conductive polymer material with a less CNF content for same conductivity and a shaped article thereof are provided. A conductive polymer material with high conductivity is produced by using carbon nanofiber with a median diameter D50 value from 0.1 to 8 μm, powder (Continued)

resistivity of 0.03 Ωcm or less measured under a load of 9.8 MPa, and D/G from 0.5 to 1.3.

14 Claims, 3 Drawing Sheets

(51) Int. Cl.
  *D01F 9/127* (2006.01)
  *C08L 101/00* (2006.01)
  *C08K 3/04* (2006.01)
  *C08L 33/10* (2006.01)
  *C08K 3/013* (2018.01)
  *C08K 3/22* (2006.01)
  *C08L 29/04* (2006.01)

(52) U.S. Cl.
  CPC ............ *C08L 101/00* (2013.01); *D01F 9/127* (2013.01); *D01F 9/1278* (2013.01); *C08K 3/013* (2018.01); *C08K 2003/2217* (2013.01); *C08K 2003/2237* (2013.01); *C08K 2201/001* (2013.01); *C08K 2201/003* (2013.01); *C08K 2201/005* (2013.01); *C08K 2201/006* (2013.01); *C08L 29/04* (2013.01)

(56) References Cited

U.S. PATENT DOCUMENTS

| | | | | |
|---|---|---|---|---|
| 2011/0101265 | A1 | 5/2011 | Kambara et al. | |
| 2014/0001416 | A1* | 1/2014 | Fiffemeier | H01M 4/1393 252/511 |
| 2014/0010749 | A1* | 1/2014 | Nakamura | D01G 13/00 423/447.1 |
| 2014/0054179 | A1* | 2/2014 | Yamamoto | H01G 11/40 205/560 |
| 2014/0272596 | A1* | 9/2014 | Yamamoto | H01M 4/625 429/232 |
| 2014/0329093 | A1 | 11/2014 | Nishio et al. | |
| 2014/0361227 | A1 | 12/2014 | Asakawa | |
| 2014/0370282 | A1 | 12/2014 | Yamamoto et al. | |
| 2016/0111626 | A1* | 4/2016 | Takagaki | C08L 101/02 310/363 |
| 2016/0348282 | A1 | 12/2016 | Kaneko et al. | |
| 2017/0288218 | A1* | 10/2017 | Horikoshi | H01M 4/525 |

FOREIGN PATENT DOCUMENTS

| | | |
|---|---|---|
| JP | 2008-308515 A | 12/2008 |
| JP | 2009-074072 A | 4/2009 |
| JP | 2010-001173 A | 1/2010 |
| JP | 5003923 B2 | 8/2012 |
| JP | 2013-201117 A | 10/2013 |
| JP | 2014181140 A | 9/2014 |
| WO | 2013099256 A1 | 7/2013 |
| WO | 2015/119102 A1 | 8/2015 |
| WO | 2014/002581 A1 | 5/2016 |

OTHER PUBLICATIONS

Koval'chuk et al "Effect of carbon nanotube functionalization on the structural and mechanical properties of polypropylene/MNCNT composites", Macromolecules 2008, 41, 7536-7542.*

Peng et al "Self-assembled natural rubber/multi-walled carbon nanotube composites using latex compounding techniques", Carbon 48 (2010) 4497-4503.*

Bhuvaneswari et al "Synthesis and characterization of Carbon Nano Fiber/LiFePO4 composites . . . ", Journal of Powder Sources 180 (2008) 553-560.*

International Search Report dated Oct. 27, 2015, issued in corresponding International Application No. PCT/JP2015/072302, filed Aug. 6, 2015, 2 pages.

Notification of Reasons for Refusal for corresponding Japanese Patent Application No. 2016-540728, dated Aug. 27, 2019, 10 pages.

Japanese Office Action, with English Translation, dated Mar. 10, 2020 in corresponding Japanese Patent Application No. 2016-540728, 5 pages.

* cited by examiner

CONDUCTIVE POLYMER MATERIAL AND MOLDED ARTICLE USING SAME

TECHNICAL FIELD

The present invention relates to a conductive polymer material, containing carbon nanofiber excellent in dispersibility, conductivity, and crystallinity and a polymer material, and a shaped article thereof. More specifically, it relates to a conductive polymer material, containing the carbon nanofiber and the polymer material and having high conductivity, and a shaped article thereof.

BACKGROUND ART

As fillers to give conductivity to polymer materials, conductive carbon materials such as acetylene black and carbon nanofiber (hereinafter, referred to as CNF) and mixtures thereof are used. In particular, use or addition of CNF is characterized in that high electric conductivity is obtained with relatively low conductive filler content. Such characteristics raise expectations. The CNF here generally has a fibrous shape with an outer diameter from 5 to 100 nm and an aspect ratio, indicating a ratio of a fiber length to the outer diameter, of 10 or more.

Dispersibility of CNF is important to use the CNF as a filler to give conductivity to a matrix, such as a polymer. Fine carbon fiber such as conventional CNF unfortunately has poor dispersibility due to a secondary structure formed by the fiber complexly entangled with each other. Therefore, production of a highly conductive polymer material by sufficiently dispersing such CNF requires a step, for example, of composition with a polymer material using a solvent (PTL 1).

PTL 2 describes a conductive composite material that is capable of efficiently exhibiting conductivity even when a small amount of CNF is added. PTL 3 describes a conductive polymer material produced by melt kneading CNF excellent in dispersibility and a thermoplastic polymer material. PTL 4 describes improvement in dispersibility and kneadability of CNF by composition with a polymer or powder.

CITATION LIST

Patent Literature

PTL 1: JP 2013-201117A
PTL 2: JP 2009-74072A
PTL 3: JP 2010-1173A
PTL 4: Japanese Patent No. 5003923

SUMMARY OF THE INVENTION

Technical Problem

The conventional techniques, however, have room for improvement in the following points.

For example, PTL 1 requires a step such as composition with a polymer material using a solvent to improve conductivity, and this is not preferred from the perspective of energy and cost. PTL 2 requires a step of heating and maintaining a conductive polymer material produced by kneading to improve conductivity, and this is not preferred from the perspective of energy and cost. PTL 4 requires fiber shortening using a ball mill, and this is not preferred from the perspective of energy and cost.

Meanwhile, in PTL 3, a conductive polymer material produced therefrom has a volume resistivity of only approximately $10^3$ Ωcm when 5 parts by weight of CNF is added.

In view of such circumstances, it is an object of the present invention to provide, by using CNF excellent in dispersibility, conductivity, and crystallinity, a conductive polymer material having high conductivity even with a low CNF content and a shaped article thereof and a conductive polymer material with a less CNF content for same conductivity and a shaped article thereof.

Solution to Problem

That is, the present invention to solve the above problems is configured as follows.

(1) A conductive polymer material, comprising: carbon nanofiber with a median diameter D50 value from 0.1 to 8 μm; and a polymer material.

(2) The conductive polymer material of (1), wherein the carbon nanofiber further has powder resistivity of 0.03 Ωcm or less, measured under a load of 9.8 MPa, and D/G from 0.5 to 1.3.

(3) The conductive polymer material of (1) or (2), wherein the carbon nanofiber has a median diameter D50 value from 0.1 to 3 μm.

(4) The conductive polymer material of any one of (1) to (3), wherein a content of the carbon nanofiber is from 0.1 to 30 mass %.

(5) The conductive polymer material of any one of (1) to (4), wherein the polymer material is any one or more of thermoplastic resins selected from a polystyrene resin, a polyvinyl alcohol resin, an acrylonitrile-butadiene-styrene resin, a polyacetal resin, a polymethyl methacrylate resin, a polypropylene resin, a polyethylene terephthalate resin, a polycarbonate resin, a polyamide resin, a polyphenylene ether resin, a polyvinyl chloride resin, a polybutylene terephthalate resin, a polyphenylene sulfide resin, and a polyetheretherketone resin.

(6) The conductive polymer material of any one of (1) to (4), wherein the polymer material is any one or more of rubbers selected from chloroprene rubber, silicone rubber, ethylene-propylene rubber, nitrile rubber, urethane rubber, epichlorohydrin rubber, fluorocarbon rubber, and natural rubber.

(7) The conductive polymer material of any one of (1) to (6), wherein the carbon nanofiber is carbon nanofiber produced using a catalyst having an active species containing cobalt as a main component from 3 to 150 mass % supported on a carrier of a magnesium-containing oxide with a specific surface area from 0.01 to 5 m²/g.

(8) The conductive polymer material of any one of (1) to (6), wherein the carbon nanofiber is carbon nanofiber produced using a catalyst having an active species containing cobalt as a main component supported on a carrier of a titanium-containing oxide with a specific surface area from 20 to 140 m²/g.

(9) The conductive polymer material of any one of (1) to (6), wherein the carbon nanofiber is carbon nanofiber produced using the catalyst of either (7) or (8) in conditions of a carbon source of carbon monoxide, a reaction temperature from 600° C. to 800° C., a carbon monoxide partial pressure from 0.04 to 0.98 MPa, a hydrogen partial pressure from 1% to 100% based on the carbon monoxide partial pressure, and a carbon monoxide gas flow rate of 1 NL/g-active species·min. or more.

(10) The conductive polymer material of any one of (1) to (6), wherein the carbon nanofiber is carbon nanofiber produced using a catalyst having an active species containing iron and nickel as main components supported on a graphite particle carrier with a specific surface area from 0.01 to 200 m²/g.

(11) The conductive polymer material of any one of (1) to (6), wherein the carbon nanofiber is carbon nanofiber produced using the catalyst of (10) in conditions of a carbon source of carbon monoxide, a reaction temperature from 550° C. to 650° C., a carbon monoxide partial pressure from 0.04 to 0.98 MPa, a hydrogen partial pressure from 1% to 100% based on the carbon monoxide partial pressure, and a carbon monoxide gas flow rate of 1 NL/g-active species·min. or more.

(12) A shaped article, comprising the conductive polymer material of any one of (1) to (11).

(13) A conductive polymer material, comprising: carbon nanofiber produced using a catalyst having an active species containing cobalt as a main component from 3 to 150 mass % supported on a carrier of a magnesium-containing oxide with a specific surface area from 0.01 to 5 m²/g; and a polymer material.

(14) A conductive polymer material, comprising: carbon nanofiber produced using a catalyst having an active species containing cobalt as a main component supported on a carrier of a titanium-containing oxide with a specific surface area from 20 to 140 m²/g; and a polymer material.

(15) A conductive polymer material, comprising: carbon nanofiber produced using a catalyst having an active species containing cobalt as a main component from 3 to 150 mass % supported on a carrier of a magnesium-containing oxide with a specific surface area from 0.01 to 5 m²/g or a catalyst having an active species containing cobalt as a main component supported on a carrier of a titanium-containing oxide with a specific surface area from 20 to 140 m²/g in conditions of a carbon source of carbon monoxide, a reaction temperature from 600° C. to 800° C., a carbon monoxide partial pressure from 0.04 to 0.98 MPa, a hydrogen partial pressure from 1% to 100% based on the carbon monoxide partial pressure, and a carbon monoxide gas flow rate of 1 NL/g-active species·min. or more; and a polymer material.

(16) A conductive polymer material, comprising: carbon nanofiber produced using a catalyst having an active species containing iron and nickel as main components supported on a graphite particle carrier with a specific surface area from 0.01 to 200 m²/g; and a polymer material.

(17) A conductive polymer material, comprising: carbon nanofiber produced using a catalyst having an active species containing iron and nickel as main components supported on a graphite particle carrier with a specific surface area from 0.01 to 200 m²/g in conditions of a carbon source of carbon monoxide, a reaction temperature from 550° C. to 650° C., a carbon monoxide partial pressure from 0.04 to 0.98 MPa, a hydrogen partial pressure from 1% to 100% based on the carbon monoxide partial pressure, and a carbon monoxide gas flow rate of 1 NL/g-active species·min. or more; and a polymer material.

Unless otherwise specified, the character "-" means a range between the values on the both sides of the character, both inclusive. For example, "A-B" means A or more and B or less.

Advantageous Effects of Invention

According to the present invention, it is possible to produce, by using CNF excellent in dispersibility, conductivity, and crystallinity, a conductive polymer material having high conductivity even with a low CNF content and a shaped article thereof and a conductive polymer material with a less CNF content for same conductivity and a shaped article thereof.

DESCRIPTION OF EMBODIMENTS

Carbon nanofiber (CNF) herein is defined to have an average outer diameter from 5 to 100 nm, preferably from 5 to 50 nm, and an aspect ratio, indicating a ratio of a fiber length to the outer diameter, of 10 or more and is a concept including multiwalled carbon nanotubes (MWCNT), which more preferably contains multiwalled carbon nanotubes as a main component. Multiwalled carbon nanotubes have an outer diameter of roughly 5 nm or more. A too large outer diameter, for example more than 50 nm, may cause a decrease in the number of multiwalled carbon nanotubes per unit weight and thus difficulty in forming a conductive network.

Figure 1:
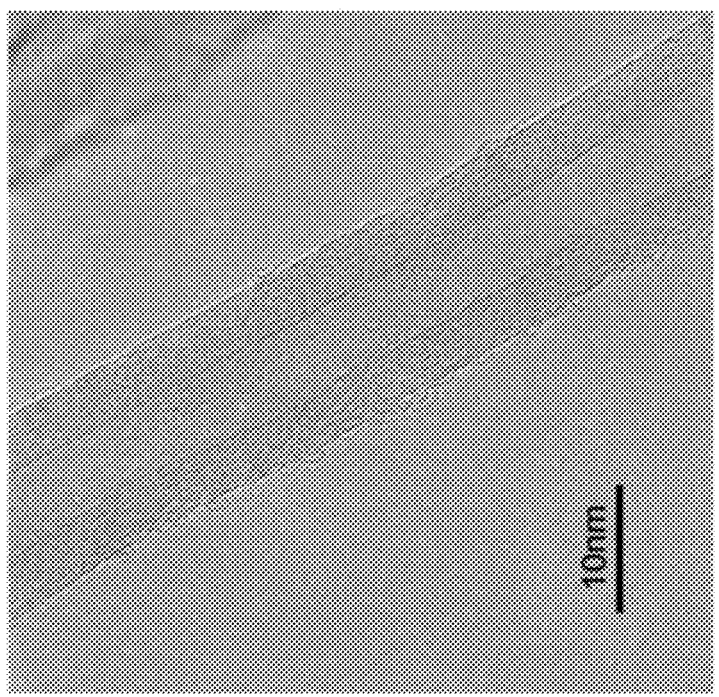
FIG. 1 is a TEM picture of CNF-C used in Examples 10-12.
Figure 2:
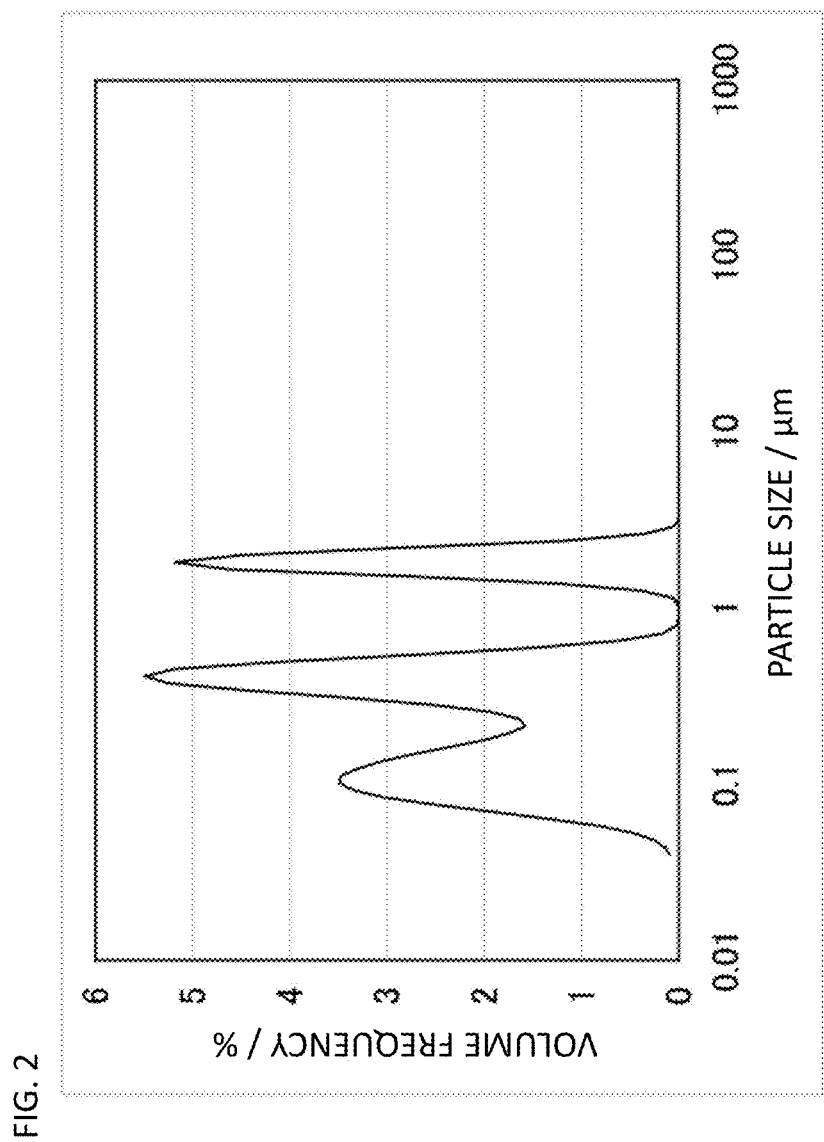
FIG. 2 is a particle size distribution graph of CNF-A used in Examples 1-8.

The definition of carbon nanofiber (CNF) herein does not include single wall carbon nanotubes (SWCNT). While being characterized in that high conductivity is exhibited, single wall carbon nanotubes are not the subject of the present invention because they have practical problems such as the presence of an isomer by the chirality and have a rigid bundle structure, resulting in difficulty in dispersion. As the carbon nanofiber (CNF) herein, multiwalled carbon nanotube is most preferred. FIG. 1 illustrates a TEM picture of CNF used in Examples 10-12 as a representative example of carbon nanofiber of the present invention. The picture illustrates that it was multiwalled carbon nanotube.

Synthetic activity herein is the mass of CNF produced per unit mass of active species and per unit time. The active species here is metal containing cobalt as a main component. In addition, a carrier means an oxide or the like to support the active species.

CNF

CNF used in the present invention is excellent in dispersibility, conductivity, and crystallinity. Specifically, it has a median diameter D50 value based on volume obtained by particle size distribution measurement (ISO 13320:2009) by laser diffraction/scattering from 0.1 to 8 μm, preferably from 0.1 to 3 μm, and most preferably from 0.1 to 1 μm. A greater median diameter D50 value means the presence of many CNF aggregates and poor dispersibility. A median diameter D50 value more than such an upper limit may cause a decrease in dispersibility to a polymer material not to sufficiently form a conductive network and not to obtain high conductivity. In contrast, CNF with a median diameter D50 value of less than 0.1 μm has short fiber and has increased contact points between the CNFs in a conductive network formed in a polymer material to increase contact resistance and it is considered not to obtain high conductivity. The median diameter D50 value may range between two values arbitrarily selected from 0.1, 0.2, 0.3, 0.4, 0.5, 0.6, 0.7, 0.8, 0.9, 1, 2, 3, 4, 5, 6, 7, and 8 μm.

Dispersibility Evaluation

The CNF used in the present invention and CNF produced by the production method herein (hereinafter, referred to as CNF described in the present invention), particularly preferably MWCNT, are characterized in high dispersibility.

The CNF described in the present invention is capable of exhibiting high dispersibility compared with conventional commercially available CNF (MWCNT). This dispersibility evaluation method is arbitrary and a known method may be used. Examples of the method include particle size distribution measurement, a particle size gauge (grind gauge), Turbi-Online, precipitation test, centrifugal sedimentation test, and the like. Particle size distribution measurement is preferably used.

In an embodiment of the CNF described in the present invention, particles with a particle size of 1 μm or less are 50 volume % or more and preferably 70 volume % or more, and may be, for example, 70-100 volume %. In another embodiment of the CNF described in the present invention, a median diameter D50 value based on volume is 8 μm or less, preferably 3 μm or less, and most preferably 1.0 μm or less and 0.1 μm or more, and for example, high dispersibility of 0.2-1.0 μm is exhibited.

The CNF described in the present invention preferably has powder resistivity of 0.03 Ωcm or less, measured under a load of 9.8 MPa. Powder resistivity of more than 0.03 Ωcm may cause a decrease in conductivity of a conductive polymer material produced therefrom. The powder resistivity may be any value selected from 0.015, 0.016, 0.017, 0.018, 0.019, 0.020, 0.021, 0.022, 0.023, 0.024, 0.025, 0.026, 0.027, 0.028, 0.029, and 0.030 Ωcm. The CNF described in the present invention has D/G obtained by Raman spectrometry preferably from 0.5 to 1.3 and most preferably from 0.5 to 1.0. The D/G here can be obtained from a ratio of, by Raman spectrometry of CNF powder, the total area derived from the D band peak to the total area derived from the G band peak. A lower D/G indicates higher crystallinity of the CNF and means higher conductivity of the CNF. An increased D/G increases bending of the CNF, causing CNFs more complexly entangled with each other. The dispersibility to a polymer material is thus prone to decrease and to increase the powder resistivity of the CNF. However, a smaller D/G requires an additional processing step to improve the crystallinity, and it has been difficult to readily produce CNF excellent in crystallinity. In contrast, the method of using a catalyst of the present invention is capable of efficiently producing CNF excellent in crystallinity with D/G from 0.5 to 1.3. The CNF having excellent dispersibility, conductive, and crystallinity by the catalyst of the present invention is used to produce a conductive polymer material more excellent in conductivity. CNF with D/G of more than 1.3 and increased bending may cause an increase in powder resistivity due to a decrease in dispersibility. It is also known that synthesis of MWCNT with D/G of less than 0.5 is difficult unless the crystallinity is improved by a graphitization process or the like. The D/G may range between two values arbitrarily selected from 0.5, 0.6, 0.7, 0.8, 0.9, 1.0, 1.1, 1.2, and 1.3.

Catalyst

The CNF described in the present invention has high dispersibility. It further has low powder resistivity and high crystallinity. To produce the present CNF, one or more catalysts selected from the following catalysts A to C are more preferably used.

Catalyst A

The catalyst A is a catalyst for producing carbon nanofiber (hereinafter, referred to as a "cobalt-magnesium oxide supported catalyst") having an active species containing cobalt as a main component supported on a carrier of a magnesium-containing oxide (the oxide is a concept including composite oxide).

Active species of Catalyst A

The cobalt-magnesium oxide supported catalyst of the present invention contains a main component of cobalt as a substantial active species for producing CNF. Cobalt may be, not only metal cobalt, in the form of a compound, such as an oxide, a hydroxide, a hydrous oxide, a nitrate, an acetate, an oxalate, and a carbonate. The active species may contain, as a component other than cobalt, element(s) of the 4th-12th groups. Examples of them include the iron group, such as iron and nickel, manganese, and molybdenum. In the 4th-12th element component contained as the active species of the catalyst, the cobalt component is desirably contained (as mol % of the cobalt element) at least 60 mol % or more, preferably 80 mol % or more, and most preferably 90 mol % or more. An active species other than these may contain element(s) of the 1st-3rd and 14th groups.

Carrier for Catalyst A

As the carrier on which the active species is supported, a magnesium-containing oxide with a specific surface area from 0.01 to 5 m²/g is preferably used. Examples of the magnesium-containing oxide include magnesium oxide, magnesium-containing spinel oxide and perovskite oxide, and the like. Among them, magnesium oxide is most preferred as the carrier. The magnesium-containing oxide has a specific surface area more preferably from 0.01 to 4 m²/g and even more preferably from 0.03 to 3 m²/g. A specific surface area of less than 0.01 m²/g may cause a decrease in crystallinity and electric conductivity of CNF produced therefrom. A specific surface area of more than 5 m²/g may cause a decrease in synthetic activity and dispersibility of CNF produced therefrom. The carrier may contain an oxide of another metal element selected from the 1st-3rd and 14th groups. The magnesium-containing oxide content in the carrier is preferably at least 50 mass % or more, more preferably 90 mass % or more, and most preferably 98 mass % or more. Less than 50 mass % of the magnesium-containing oxide may cause a decrease in synthetic activity.

A higher cobalt support ratio increases catalytic activity and further tends to improve the crystallinity of CNF produced therefrom. A too high ratio may cause an increase in particle size of cobalt and a decrease in synthetic activity. In contrast, a low cobalt support ratio increases the synthetic activity while it tends to reduce the catalytic activity and may cause a decrease in crystallinity and electric conductivity of CNF produced therefrom. The cobalt support ratio on the carrier is arbitrary, while it is preferably from 3 to 150 mass % and most preferably from 5 to 90 mass %. The support ratio herein, including the cases of the catalyst B and the catalyst C, is calculated based on the following equation.

Support ratio=Mass of active species (as metal component)/Mass of carrier×100(%)

For supporting cobalt on the carrier, a support method is not particularly limited. For example, the carrier is impregnated in a non-aqueous solution (e.g., an ethanol solution), an aqueous solution, or a mixed solution thereof in which a salt of cobalt is dissolved for sufficient dispersion mixing, followed by drying and sintering in air at high temperatures (e.g., 300° C.-600° C.), thereby capable of supporting cobalt on the carrier. As another example, the carrier may be impregnated in a non-aqueous solution (e.g., ethanol) or an aqueous solution in which a salt of cobalt is simply dissolved for sufficient dispersion mixing, followed only by dehydration drying. Alternatively, the carrier may be impregnated in a non-aqueous or aqueous solution in which a salt of cobalt is dissolved for sufficient dispersion mixing, followed by neutralization with alkali and then dehydration, drying, and sintering. For drying, a method such as spray drying may be used.

For use of the present catalyst, the reaction temperature for synthesis of CNF is as described below and is particularly preferably 600° C. or more and 750° C. or less.

Catalyst B

The catalyst B is a catalyst (hereinafter, referred to as a "cobalt-titanium oxide supported catalyst") having metal of an active species containing cobalt as a main component supported on a titanium-containing oxide (the oxide is a concept including composite oxide).

Active Species of Catalyst B

The cobalt-titanium oxide supported catalyst of the present invention contains a main component of cobalt as a substantial active species for producing CNF. The description on the active species of the catalyst B is same as that on the active species in the catalyst A including the preferred embodiments.

Carrier of Catalyst B

As the carrier, a titanium-containing oxide with a specific surface area from 20 to 140 m$^2$/g is preferably used. Examples of the titanium-containing oxide include titanium oxide, titanium-containing spinel oxide and perovskite oxide, and the like. Among them, titanium oxide is most preferred as the carrier. The specific surface area is more preferably from 25 to 100 m$^2$/g and even more preferably from 40 to 70 m$^2$/g. A specific surface area of 20 m$^2$/g or more improves the synthetic activity. A specific surface area of 140 m$^2$/g or less also has an advantage of generating high synthetic activity. When titanium oxide is used as the carrier, the carrier may be titanium oxide alone or a mixture with another oxide. From the perspective of generating high synthetic activity, such titanium oxide preferably has a crystal structure of a rutile structure or a mixture of a rutile structure and an anatase structure, while it may be of an anatase structure. Examples of the titanium-containing composite oxide include potassium titanate, barium titanate, strontium titanate, calcium titanate, magnesium titanate, lead titanate, aluminum titanate, lithium titanate, and the like. Among them, from the perspective of generating high synthetic activity, barium titanate is preferred. When such a titanium-containing composite oxide is used as the carrier, the carrier may be the composite oxide alone or a mixture with another oxide. A mass ratio of the titanium-containing oxide in the carrier is preferably at least 50 mass % or more, more preferably 90 mass % or more, and most preferably 98 mass % or more. The titanium-containing oxide contained 50 mass % or more is capable of improving the conductivity, the crystallinity, and the like.

A higher cobalt support ratio increases the yield of CNF, whereas a too high ratio may cause an increase in particle size of cobalt and thickness of CNF produced therefrom, and thus tends to reduce the synthetic activity per active species. In contrast, a low cobalt support ratio reduces the particle size of cobalt to be supported to produce thin carbon nanotubes while it tends to reduce the synthetic activity per catalyst. The optimum cobalt support ratio varies depending on the pore volume, the external surface area, and the support method of the carrier, while it is preferably from 0.1 to 50 mass %, more preferably from 1 to 40 mass %, and most preferably from 5 to 30 mass %. The support ratio ranging from 0.1 to 50 mass % improves the synthetic activity per catalyst, resulting in advantageous costs.

For supporting the active species on the carrier, a support method is not particularly limited. For example, the carrier is impregnated in a non-aqueous solution (e.g., an ethanol solution), an aqueous solution, or a mixed solution thereof in which a salt of cobalt is dissolved for sufficient dispersion mixing, followed by dehydration and sintering in air (e.g., 300° C.-700° C.), thereby capable of supporting the active species on the carrier. As another example, the carrier may be impregnated in a non-aqueous (e.g., ethanol) or aqueous solution in which a salt of cobalt is simply dissolved for sufficient dispersion mixing, followed only by dehydration drying. Alternatively, the carrier may be impregnated in a non-aqueous or aqueous solution in which a salt of cobalt is dissolved for sufficient dispersion mixing, followed by neutralization with alkali and then dehydration, drying, and sintering. For drying, a method such as spray drying may be used.

For use of the present catalyst, the reaction temperature for synthesis of CNF is as described below and is particularly preferably 600° C. or more and 750° C. or less.

Catalyst C

The catalyst C is a catalyst having an active species containing either iron or nickel as main components supported on a carbon particle carrier.

Active Species of Catalyst C

As the active species of the catalyst, an active species containing either iron or nickel as a main component is used. Iron and nickel in this context may be, not only in the form of metal, in the form of a compound, such as an oxide, a hydroxide, a hydrous oxide, a nitrate, an acetate, an oxalate, and a carbonate.

From the perspective of suitable function of the active species containing either iron or nickel as a main component, the active species of the catalyst is desirably configured from, in the components except the carrier, preferably 70 mass % or more and more preferably 95 mass % or more of iron and nickel (total value of both as the metal components). Satisfaction of the conditions enables production of CNF of relatively high crystallinity, electric conductivity, and dispersibility at high CNF synthetic activity.

When the catalyst using the active species containing iron and nickel as main components is employed, CNF produced therefrom is substantially carbon nanotubes (CNT). Meanwhile, when the active species contains iron as a main component, CNF produced therefrom contains many herringbone structures. Considering the properties to give high conductivity (low volume resistivity) and crystallinity and particularly the mechanical strength as fiber, the carbon nanotubes (CNT) structure is preferred. The active species containing iron and nickel as main components is therefore preferred.

When the active species contains iron and nickel as main components, a mass ratio of iron to nickel is arbitrary. When the active species contains iron and nickel as main components, the crystallinity and the dispersibility of CNF produced therefrom are improved. The most preferred mass ratio of iron to nickel for use of the catalyst C ranges Fe:Ni=6:4-4:6. The active species of the composition within this range allows CNF produced therefrom to exhibit extremely high dispersibility as well as high conductivity and crystallinity.

Examples of components that may be contained in a small amount other than iron and nickel include cobalt, manganese, molybdenum, copper, and tungsten, and in addition, not excluding inclusion of components of the 1st-3rd and 14th groups.

Carrier of Catalyst C

As the carrier, carbon particles with a specific surface area generally from 0.01 to 200 $m^2/g$ and preferably from 0.1 to 20 $m^2/g$ are used. Examples of the carbon particles here include graphite particles, various carbon blacks, and the like. They are preferably graphite particles, and specifically natural graphite or artificial graphite. Use of such carbon particles as the carrier enables generating very high CNF synthetic activity and thus efficient production of a CNF-carbon material composite. Different from general metal oxide carriers, use of conductive carbon particles for the carrier is characterized in production of a CNF-carbon material composite excellent in conductivity without removing the carrier from the CNF thus produced.

The carbon particles here preferably have a ratio of a cross-sectional thickness to a longitudinal width (aspect ratio) ranging 1-less than 10. The longitudinal width refers to a length of the longest segment capable of penetrating the graphite material being measured, and the cross-sectional thickness refers to a length of the longest segment capable of penetrating the graphite material being measured among the segments vertical to the longitudinal width. The carbon particles may form a structure to contact with and bond to each other, which is a so-called secondary particle structure.

Remarkably, use of the most preferred graphite particles with a specific surface area from 0.1 to 20 $m^2/g$ as the carrier for the active species enables production of a CNF-carbon material composite excellent in dispersibility. This is considered because the CNF directly produced by CNF synthesis reaction using the catalyst C is essentially highly dispersible and has less interaction, for example entanglement, with the graphite particle carrier. Use of such a graphite particle carrier has a further advantage of low bonding strength to metal active species, allowing the metal active species to be readily liberated from the carrier.

Conversely, when carbon particles, for example carbon black, with a specific surface area of less than 0.1 $m^2/g$ or more than 20 $m^2/g$ are used, high activity is sometimes not capable of being generated. Specifically, a specific surface area of less than 0.1 $m^2/g$ causes insufficient dispersibility of a supported metal catalyst and is prone to decrease the activity. A specific surface area of more than 20 $m^2/g$ causes a decrease in CNF synthetic activity and increasing entanglement with CNFs thus produced each other and the CNFs each other including the carrier, leading to a concern of decreasing the dispersibility.

Examples of the preferred natural graphite include bulk graphite, flake graphite, and earthy graphite. Graphite particles derived from them may be used as well. For example, natural graphite that is purified for higher purity and laminar graphite are preferably used. Particulate graphite derived from such natural graphite is available from, for example, Nippon Graphite Industries Co., Ltd. Preferably used artificial graphite particles are produced from coke, pitch, coal tar, and resins and have the specific surface area described above. This category includes mesophase carbon and glassy carbon. Particulate graphite derived from such artificial graphite may be purchased from, for example, Tokai Carbon Co., Ltd., Hitachi Chemical Company, Ltd., Showa Denko K.K., and Nippon Graphite Industries Co., Ltd. Even the graphite particles used as a material for lithium ion battery anodes may be preferably used.

When the active species is supported on the graphite particle carrier, a support method is not particularly limited and a known method may be used. For example, the graphite particle carrier is impregnated in a non-aqueous solution (e.g., an ethanol solution), an aqueous solution, or a mixed solution thereof in which a metal salt is dissolved for sufficient dispersion mixing, followed by dehydration drying, thereby capable of supporting the active species on the graphite particle carrier. Alternatively, the graphite particle carrier may be impregnated in a non-aqueous or aqueous solution in which a metal salt is dissolved for sufficient dispersion mixing, followed by neutralization with alkali and then dehydration and drying. For drying, a method such as spray drying may be used. Other methods are described in, for example, "Handbook of Catalyst Preparation", ed. Iwamoto, Masakazu, pub. Catalysis Society of Japan NTS, Apr. 25, 2011 (in Japanese).

The support ratio of the active species on the graphite particle carrier varies depending on the pore volume, the external surface area, and the support method of the carrier, while it is generally from 1 to 50 mass %. The support ratio of less than 1 mass % tends to reduce the synthetic activity. The ratio of more than 50 mass % causes an increase in the thickness of CNF produced therefrom and causes a decrease in the synthetic activity. From the perspective of the synthetic activity, the support ratio from 1 to 10 mass % is most preferred.

One or more catalysts selected from the preferred catalysts A, B, and C are used for synthesis in reaction conditions suitable for the respective catalysts to produce CNF with high crystallinity, high conductivity, and high dispersibility. These characteristics may be achieved by CNF produced by synthesis reaction without using a fluid material of such a particulate carbon material. However, the conditions to produce simple CNF combining these characteristics are limited and the synthetic activity is not sufficient. There is a problem that slight alteration of the conditions often particularly causes a severe decrease in the dispersibility. The dispersibility of CNF and the synthetic activity and the productivity of CNF are in a trade-off, and there is thus a problem that improvement of the dispersibility causes a decrease in the activity and the productivity of CNF. The production method of the present invention allows production of a highly dispersible CNF composite, and during the production, use of one or more catalysts selected from the catalysts A to C that is capable of giving high crystallinity, high conductivity, and high dispersibility to the CNF enables production of a CNF composite more excellent in conductivity and dispersibility with higher activity and productivity.

Carbon-Containing Gas

As a carbon-containing gas, hydrocarbon, carbon monoxide, carbon dioxide, and a mixture thereof that have a carbon number from 1-10 may be used. Examples of the hydrocarbon may include methane, ethane, propane, ethylene, propylene, benzene, toluene, and acetylene. In the present invention, carbon monoxide is most preferably used. Use of carbon monoxide enables production of CNF with high crystallinity and conductivity even at relatively low reaction temperatures.

Method and Conditions of Producing CNF

Although the detailed description below is given to the case of using carbon monoxide most suitable for the raw material gas, the present invention is not limited to this.

Carbon monoxide used as the raw material gas may be a mixed gas with carbon dioxide or hydrogen and may contain an inert gas, such as a nitrogen gas. The carbon monoxide gas has a partial pressure preferably from 0.04 to 0.98 MPa, more preferably from 0.05 to 0.3 MPa, and most preferably from 0.05 to 0.1 MPa. A carbon monoxide gas partial pressure of less than 0.04 MPa may cause a decrease in the synthetic activity and a decrease in the crystallinity and the conductivity of CNF produced therefrom. A carbon monoxide gas partial pressure of higher than 0.98 MPa may cause a decrease in the dispersibility of CNF produced therefrom and may cause rapid deactivation of the catalyst to reduce the synthetic activity.

A hydrogen gas partial pressure is preferably 1%-100% based on a carbon monoxide gas partial pressure and more preferably 10%-100%. A hydrogen gas partial pressure of more than 100% to the carbon monoxide gas partial pressure may cause a decrease in the synthetic activity and a decrease in the crystallinity and the conductivity of CNF produced therefrom. A hydrogen gas partial pressure of less than 1% may cause deactivation of the catalyst in an early stage and a decrease in the synthetic activity.

The hydrogen gas partial pressure relative to the carbon monoxide gas partial pressure may be calculated by the following equation.

Hydrogen Gas Partial Pressure to Carbon Monoxide Gas Partial Pressure=Molar Ratio of Hydrogen Gas/Molar Ratio of Carbon Monoxide Gas×100 (%)

For example, for a mixed gas of raw material gas composition of $CO/H_2/N_2=85/15/0$, the hydrogen gas partial pressure relative to the carbon monoxide gas partial pressure may be calculated as the hydrogen gas partial pressure to the carbon monoxide gas partial pressure=15/85×100=18(%).

A total gas partial pressure in which an inert gas is added to the raw material gases of the carbon monoxide gas, hydrogen, and carbon dioxide is preferably less than 1.0 MPa. A full pressure of more than 1.0 MPa may increase the costs for high pressure resistant facilities and utilities in production. At a greatly reduced pressure compared with 0.1 MPa (atmospheric pressure), for example at less than 0.08 MPa, sealing to prevent mixing of the atmosphere (oxygen) into a reactor at high temperatures is sometimes difficult, and this is not preferred.

A carbon monoxide gas flow rate is preferably 2 NL/g-active species·min. or more. The carbon monoxide gas flow rate is set within this range to enable production of CNF with high synthetic activity. The high synthetic activity in this context specifically means 10 g-CNF/g-active species·h (hour) or more. Although the carbon monoxide gas flow rate has no particular upper limit, the rate of more than 200 NL/g-active species·min. causes a too high gas flow rate and increases the utility costs for the residual heat, and this is not preferred. In addition, the synthetic activity sometimes decreases.

"NL" denotes a gas volume L (liter) in terms of the normal state (0° C., 1 atm.), and "NL/g-active species·min." denotes a gas flow rate for 1 min. in the presence of unit active species (per gram of active species).

The reaction temperature for synthesis of CNF using the catalysts A and B is preferably from 600° C. to 800° C. and more preferably from 700° C. to 750° C. The reaction temperature of less than 600° C. may cause a decrease in the crystallinity, the conductivity, and the dispersibility of CNF. The temperature of more than 800° C. may cause a decrease in the synthetic activity.

The reaction temperature for synthesis of CNF using the catalyst C is preferably from 550° C. to 650° C. The reaction temperature of less than 550° C. may cause a decrease in the crystallinity, the conductivity, and the dispersibility of CNF. The temperature of more than 650° C. may cause deactivation of the catalyst.

A reactor that may be used in production of the CNF described in the present invention is not particularly limited as long as the reactor is in any shape capable of storing the catalyst and the particulate carbon material in a gas atmosphere containing a carbon-containing compound and the reactor has a function of mechanically stirring the catalyst and CNF produced therefrom by mechanically operating all or part of the reactor. The moving part(s) of the reactor may be something such as a stirring blade and a paddle, or the reactor itself may be rotated or vibrated. Examples of the latter include a rotary kiln reactor. In the present invention, the reactor is preferably a rotary reactor having a mechanically stirring function and more preferably a horizontal rotary reactor that may have a slight inclination such as a rotary kiln reactor. The catalyst and CNF produced therefrom in the reactor are mechanically stirred to allow contact with the carbon-containing gas as a raw material with high uniformity. Reaction in the reactor may be batch reaction or continuous reaction.

From the CNF thus produced, the active species and the carrier are preferably removed to increase the purity. Removal of the active species and the carrier may be specifically performed by a method described in JP 2006-69850A and the like in which the CNF is dispersed in acid, such as hydrochloric acid, nitric acid, and sulfuric acid, followed by recovery of CNF by a technique, such as filtration and centrifugation.

CNF Content

The CNF content in the conductive polymer material of the present invention is arbitrary depending on the target conductivity and use. The content is generally from 0.1 mass % to 30 mass % and preferably from 1 mass % to 10 mass %. The CNF content may range between two values arbitrarily selected from 0.1, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10, 11, 12, 13, 14, 15, 16, 17, 18, 19, 20, 21, 22, 23, 24, 25, 26, 27, 28, 29, and 30. The CNF content may be calculated from the following equation.

CNF Content (mass %)=(Mass of CNF in Conductive Polymer Material/Mass of Conductive Polymer Material)×100

An aspect of the present invention is a conductive polymer material containing: CNF produced using one or more catalysts selected from the catalysts A, B, and C above; and a polymer material. Because of the characteristics of the CNF described in the present invention, that is, as described above, the high dispersibility, low powder resistivity, and high crystallinity compared with conventional CNF, the conductive polymer material of the present invention is capable of exhibiting higher conductivity compared with the case of using other CNF.

Another aspect of the present invention is a conductive polymer material containing: CNF produced by the production method using one or more catalysts selected from the catalysts A, B, and C above; and a polymer material. Because of the characteristics of the CNF described in the present invention, that is, as described above, the high dispersibility, low powder resistivity, and high crystallinity compared with conventional CNF, the conductive polymer material of the present invention is capable of exhibiting higher conductivity compared with the case of using other CNF.

The polymer material used in the present invention is arbitrary, and a known polymer material may be used. The concept of the polymer material used in the present invention includes a thermoplastic resin, a thermosetting resin, and, rubber.

Thermoplastic Resin

Examples of the thermoplastic resin include polyvinyl chloride resins with or without a plasticizer; polyolefin resins such as low density polyethylene, high density polyethylene, straight-chain low-density polyethylene, a polyolefin elastomer (POE), various kinds of tactic or atactic polypropylene, polyethylene-propylene copolymers (EPR), and cyclic polyolefin; styrene-based resins such as a polystyrene resin, an acrylonitrile-butadiene-styrene (ABS) resin, and an acrylonitrile-styrene (AS) resin; poly(meth) acrylic resins such as polymethyl acrylate, polymethyl methacrylate, polyethyl acrylate, polyethyl methacrylate, polyacrylic acid, and polymethacrylic acid; polyacrylonitrile resins; polyester resins such as polybutylene terephthalate and polyethylene terephthalate; polylactic acid resins; ionomer resins; polycarbonate resins; and polyamide resins such as various kinds of nylon; a polyacetal resin; a polyphenylene ether resin; a modified polyphenylene ether resin; a polyarylate resin; a polysulfone resin; a polyetherimide resin; a polyether sulfone resin; a polyphenylene sulfide resin; a polyetheretherketone resin; a polyetherketone resin; a polyamide imide resin; a thermoplastic polyimide resin; a liquid crystal polyester resin; styrene-diene block copolymers such as SBS (styrene-butadiene-styrene block copolymer), SIS (styrene-isoprene-styrene block copolymer), SEBS (styrene-ethylene-butylene-styrene block copolymer), and SEPS (styrene-ethylene-propylene-styrene block copolymer) and hydrogenation products thereof; ethylene-styrene copolymers; various cross copolymers described in WO 00/037517 re-published in Japanese and WO 07/139116; petroleum resins; and polymer alloys thereof.

In the present invention, these thermoplastic resins may be used singly or in combination of two or more.

The resin is preferably any one or more selected from polystyrene resins, polyvinyl alcohol resins, acrylonitrile-butadiene-styrene (ABS) resins, polyacetal resins, polymethyl methacrylate resins, polypropylene resins, polyethylene terephthalate resins, polycarbonate resins, polyamide resins, polyphenylene ether resins, polyvinyl chloride resins, polybutylene terephthalate resins, polyphenylene sulfide resins, and polyetheretherketone resins. Examples of the thermosetting resin include various epoxy resins, cyanate resins, benzoxazine resins, and bismaleimide resins.

Examples of the rubber used in the present invention include, but not particularly limited to, chloroprene rubber, silicone rubber, ethylene-propylene rubber, nitrile rubber, urethane rubber, epichlorohydrin rubber, fluorocarbon rubber, and natural rubber.

Conductive Polymer Material Production Method

A method of producing the conductive polymer material of the present invention, particularly the conductive polymer material of the thermoplastic resin and the CNF is not particularly limited, and an appropriate known blending method or kneading method may be used. Melt mixing may be performed using, for example, a single-screw or twin-screw extruder, a Banbury mixer, a Plastomill, a cokneader, a heating roller, or the like. Before melt mixing, each raw material may be uniformly mixed with a Henschel mixer, a ribbon blender, a super mixer, a tumbler, or the like. The melt mixing temperature is, but not particularly limited to, generally 100° C.-300° C. and preferably 150° C.-250° C. In a general method of producing the conductive polymer material of the thermosetting resin and the CNF, the respective raw materials of an uncured thermosetting resin and the CNF, and also a curing agent, a curing catalyst, and various additives as needed, are uniformly mixed with a batch or continuous stirrer, a Henschel mixer, a ribbon blender, a super mixer, a tumbler, or the like and then poured into a mold, followed by heating for curing. In a general method of producing the conductive polymer material of the rubber and the CNF, raw rubber and the CNF, and also a crosslinker, a crosslinking coagent, and various additives as needed are mixed with a batch or continuous stirrer or a heating roller and, using a mold as needed, heated for curing.

For production of a shaped article of the conductive polymer material of the present invention, the producing method may be by, but not particularly limited to, press molding, extrusion molding, inflation, casting, roll forming, injection molding, or transfer molding.

The conductive polymer material of the present invention may contain a component other than the above CNF as a conductive filler. As the conductive filler other than the CNF, carbon black such as carbon fiber, artificial graphite, natural graphite, acetylene black, and furnace black, expanded graphite, metal powder, and the like that are not defined herein may be used.

EXAMPLES

The present invention is described below with Examples. These Examples do not limit the present invention.

Specific Surface Area Measurement

A specific surface area of the CNF powder was obtained by BET single point method in accordance with JIS K6217-2 using Macsorb HM model-1201 manufactured by Mountech Co., Ltd.

Calculation of Average Fiber Diameter

Using the value of the specific surface area obtained by the above method, an average fiber diameter of the CNF was calculated from the following equation.

$$\text{Average Fiber Diameter (nm)} = 1000 \times 4/(P \times S)$$

In this equation, p denotes the density (g/cm$^3$) of the CNF and S denotes the specific surface area (m$^2$/g) of the CNF. The density of the CNF was assumed 1.8 g/cm$^3$ based on a non-patent literature, Peng-Cheng Maa, Naveed A. Siddiqui a, Gad Marom b, Jang-Kyo Kim a; Dispersion and functionalization of carbon nanotubes for polymer-based nanocomposites: A review, Composites: Part A 2010; 41: 1345-1367. Calculation results are shown in Table 1.

Powder Resistivity Measurement

Volume Resistivity Measurement

The volume resistivity of the CNF powder was obtained by four probe method in conditions of an atmosphere at 23° C. and relative humidity of 50% under a load of 9.8 MPa using Loresta GP: powder resistivity measurement system MCP-PD51 model manufactured by Mitsubishi Chemical Analytech Co., Ltd. For the measurement, a 100 mg sample was used.

Raman Spectrometry

Raman spectrometry of the CNF powder was carried out using a microscopic laser Raman spectrometer (Niolet Almega-XR manufactured by Thermo Fisher Scientific K.K., laser at 532 nm). The D band (D1: peak position 1330 cm-1, D3: 1500 cm-1, D4: 1150 cm-1) and the G band (G+: 1600 cm-1, G−: 1570 cm-1) were subjected to waveform separation, and then a ratio (D/G) of the total area derived from the D band peak to the total area derived from the G band peak was obtained. A lower D/G indicates higher crystallinity of the CNF.

(Reference)

D1: derived from point defects in the graphite crystal structure and defects derived from crystal edges D3: derived from amorphous carbon D4: derived from polyene and ionic impurities G+: graphite crystalline peak in longitudinal optical mode G−: graphite crystalline peak in transverse optical mode Dispersibility Evaluation: Particle Size Distribution Measurement by Laser Diffraction/Scattering (ISO 13320:2009)

Dispersibility was evaluated with a particle size distribution analyzer (LS 13 320 universal liquid module manufactured by Beckman Coulter, Inc.).

Prior to measurement of the ratio of dispersed particles of 1 μm or less and the median diameter D50 value, the particle size distribution analyzer was inspected. When the median diameter D50 value obtained from measurement of each calibration sample below satisfied all the criteria below, measurement accuracy of the analyzer was assessed as satisfactory to perform particle size distribution measurement in Examples and Comparative Examples.

Preparation of Aqueous Dispersion Medium

To 100 mL of distilled water, 0.10 g of sodium carboxymethylcellulose (hereinafter, referred to as CMCNa) was added and stirred at ordinary temperature for 24 hours and dissolved to prepare an aqueous dispersion medium of 0.1 mass % CMCNa.

Preparation of Aqueous CMCNa Solution

To 100 mL of distilled water, 2.0 g of sodium carboxymethylcellulose was added and stirred at ordinary temperature for 24 hours and dissolved to prepare an aqueous solution of 2.0 mass % CMCNa.

Preparation and Inspection of Calibration Samples (1) Inspection with Polystyrene Dispersion LATRON 300LS (median diameter D50 value of 0.297 μm), an aqueous dispersion for calibration of measurement accuracy, was used, which is an accessory to the particle size distribution analyzer (LS 13 320 universal liquid module manufactured by Beckman Coulter, Inc.).

An optical model was set for the respective refractive indices of 1.600 for polystyrene and 1.333 for water, and after the end of washing the module, approximately 1.0 mL of the aqueous CMCNa solution was filled. In a condition of a pump speed of 50%, offset measurement, optical axis adjustment, and background measurement were carried out, followed by particle size distribution measurement by applying LATRON 300LS to the particle size distribution analyzer in such a manner that a relative concentration indicating percentage of light scattering outside the beam due to the particles was 8%-12% or PIDS (polarization intensity differential scattering) was 40%-55%. A graph of volume % to a particle size (particle diameter) was obtained to inspect the accuracy. The median diameter D50 value obtained from the measurement was confirmed to fall within a range of 0.297 μm±0.018 μm, the D10 value within 0.245 μm±0.024 μm, and the D90 value within 0.360 μm±0.036 μm.

(2) Inspection with Alumina Dispersion

In a vial, 0.120 g each of alumina LS-13 (median diameter D50 value of 45 μm) produced by Denka Company Limited and alumina AS-50 (median diameter D50 value of 6.7 μm) produced by Showa Denko K.K. were weighed and 12.0 g of the aqueous dispersion medium was added, and then the vial was shaken well to prepare an aqueous alumina dispersion.

An optical model was set for the respective refractive indices of 1.768 for alumina and 1.333 for water, and after the end of washing the module, approximately 1.0 mL of the aqueous CMCNa solution was filled. In a condition of a pump speed of 50%, offset measurement, optical axis adjustment, and background measurement were carried out, followed by particle size distribution measurement by applying the aqueous alumina dispersion thus prepared to the particle size distribution analyzer in such a manner that a relative concentration indicating percentage of light scattering outside the beam due to the particles was 8%-12% or PIDS was 40%-55%. A graph of volume % to a particle size (particle diameter) was obtained to inspect the accuracy. The D50 value obtained from the measurement was confirmed to fall within a range of 48.8 μm±5.0 μm for LS-13 and 12.6 μm±0.75 μm for AS-50.

Premeasurement Process

In a vial, 6.0 mg of CNF was weighed and 6.0 g of the aqueous dispersion medium was added. For premeasurement process, an ultrasonic homogenizer Smurt NR-50 (manufactured by Microtec Co., Ltd.) was used.

The tip was confirmed not to be degraded and adjusted to be immersed in the process sample liquid, 10 mm or more from the fluid level. By setting TIME SET (irradiation time) as 40 sec., POW SET as 50%, and START POW as 50% (output 50%), automated power operation with a fixed output power was performed for ultrasonic irradiation, thereby homogenizing to prepare an aqueous CNF dispersion.

CNF Particle Size Distribution Measurement

Using the aqueous dispersion prepared by the method, a ratio of dispersed particles of 1 μm or less and a median diameter D50 value were measured in accordance with the following method. An optical model of the LS 13 320 universal liquid module was set for the respective refractive indices of 1.520 for CNF and 1.333 for water, and after the end of washing the module, approximately 1.0 mL of an aqueous CMCNa solution was filled. In a condition of a pump speed of 50%, offset measurement, optical axis adjustment, and background measurement were carried out, followed by applying the aqueous dispersion thus prepared to the particle size distribution analyzer in such a manner that a relative concentration indicating percentage of light scattering outside the beam due to the particles was 8%-12% or PIDS was 40%-55%, and ultrasonic irradiation (premeasurement process) at 78 W for 2 min. by an accessory to the particle size distribution analyzer and then circulation for 30 sec. to remove bubbles for particle size distribution measurement. A graph of volume % to a particle size (particle diameter) was obtained to determine a ratio of the presence of dispersed particles of 1 μm or less and a median diameter D50 value.

The particle size distribution was measured by collecting three measurement samples at different collection sites per CNF sample to obtain average values of ratios of the presence of dispersed particles of 1 μm or less and median diameter D50 values.

Samples (CNFs and comparative samples) used for the measurement are not at all subject to dispersion process other than the above standardized premeasurement process. In this context, "dispersion process other than the above standardized premeasurement process" means known dispersion process giving influence to the dispersibility, including manual dispersion process with a mortar or the like, mechanical dispersion process by a jet mill, a bead mill, a ball mill, an emulsifying and dispersing device, or the like, and dispersion process using ultrasonic waves such as an ultrasonic homogenizer other than the above premeasurement process or an ultrasonic washing machine.

Fixed Bed CNF Synthesis Reactor

As a fixed bed synthesis reactor, a vertical reactor of quartz glass with an electric furnace for heating and a raw material gas port was used for reaction. In the reactor, there was a quartz plate for charging with the catalyst.

Rotary CNF Synthesis Reactor

Figure 3:
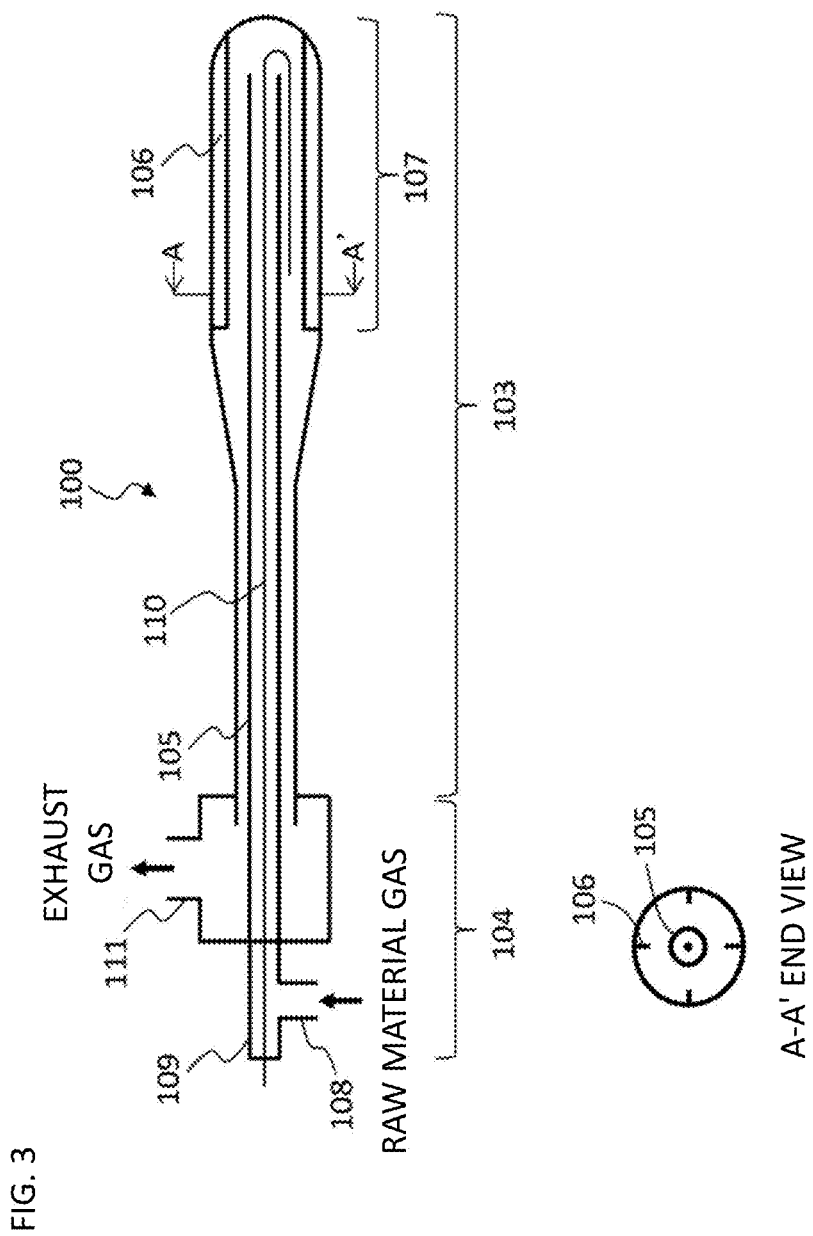
FIG. 3 is a drawing of a rotary reactor used for synthesis of CNF-A and B

A horizontal rotary reactor 100 schematically illustrated in FIG. 3 was connected to a commercially available rotary evaporator (N-1110V manufactured by Tokyo Rikakikai Co., Ltd.), not shown, for batch reaction. The reactor 100 was configured by a fixed area 104 (not rotating, made of Pyrex glass) and a rotation area 103 (made of cylindrical quartz glass). Further, at the center of the reactor 100, a non-rotating gas introduction area 105 (tubular, diameter of 12 mm) was connected to the fixed area 104. The rotation area 103 had a reaction area 107 (length of approximately 20 cm, diameter of 5 cm) with stirring blades 106 on an inner wall of the cylindrical portion at an end thereof. The stirring blades 106 were arranged as illustrated in an A-A' end view of FIG. 3. The fixed area 104 was provided with a gas introducing pipe 108 vertically connected to the gas introduction area 105 and a thermocouple introducing pipe 109 connected straight to the gas introduction area 105. From the thermocouple introducing pipe 109, sealed thermocouples 110 were introduced was reversed 180 degrees outside the outlet of the gas introduction area 105. A thermocouple temperature measuring portion measures the temperature of a gas phase in the reaction area 107 outside the gas introduction area 105. The thermocouples 110 were provided three to measure the temperatures at the center, the right end, and the left end of the reaction area 107. Independent control of three electric furnaces of a three zone horizontal tubular electric furnace, not shown, arranged at an outer periphery of the reaction area 107 enables uniform heating of the entire reaction area 107. A gas exhaust pipe 111 connected to the outer periphery of the fixed area 104 was provided to discharge an exhaust gas from the reaction area 107.

Fluid Material

For reaction using a rotary synthesis reactor, carbon nanotubes (CNF-C in Examples herein) were used that were produced in advance by a fixed synthesis reactor as a fluid material to mechanically uniformly fluidize the catalyst.

Reaction

Reaction was carried out by charging the reaction area 107 of the reactor 100 with predetermined amounts of the catalyst and the fluid material and placing the reactor 100 horizontally or with a slight downward inclination of the reaction area 107 to flow the raw material gas from the gas introducing pipe 108 through the gas introduction area 105 and the reaction area 107 to the gas exhaust pipe 111 while rotating the rotation area 103 at a predetermined number of revolutions.

Cobalt-Magnesium Oxide Supported Catalyst

Catalyst Preparation Example 1

Cobalt nitrate hexahydrate (3N5 produced by Kanto Chemical Co., Inc.) was weighed to 6.17 g and dissolved in 30 g of a mixed solvent of distilled water and ethanol at a mass ratio of 2:1. To the aqueous cobalt nitrate solution, 2.5 g of magnesium oxide (DENMAG® KMAOH-F produced by Tateho Chemical Industries Co., Ltd.) with a specific surface area of 0.61 $m^2/g$ was added and stirred for 1 hour in a state of being maintained at 50° C. in a water bath. After stirring, water was evaporated by an evaporator. The solid component thus produced was vacuum dried at 60° C. for 24 hours and then sintered at 400° C. for 5 hours. After sintering, the solid component thus produced was ground in an agate mortar to produce a cobalt-magnesium oxide supported catalyst on which 50 mass % of cobalt metal was supported.

Catalyst Preparation Example 2

Cobalt nitrate hexahydrate (3N5 produced by Kanto Chemical Co., Inc.) was weighed to 0.62 g and dissolved in 30 g of a mixed solvent of distilled water and ethanol at a mass ratio of 2:1. To the aqueous cobalt nitrate solution, 2.5 g of magnesium oxide (DENMAG® KMAO-H produced by Tateho Chemical Industries Co., Ltd.) with a specific surface area of 0.61 $m^2/g$ was added and stirred for 1 hour in a state of being maintained at 50° C. in a water bath. After stirring, water was evaporated by an evaporator. The solid component thus produced was vacuum dried at 60° C. for 24 hours and then sintered at 400° C. for 5 hours. After sintering, the solid component thus produced was ground in an agate mortar to produce a cobalt-magnesium oxide supported catalyst on which 5 mass % of cobalt metal was supported.

Catalyst Preparation Example 3

Cobalt nitrate hexahydrate (3N5 produced by Kanto Chemical Co., Inc.) was weighed to 2.47 g and dissolved in 30 g of a mixed solvent of distilled water and ethanol at a mass ratio of 2:1. To the aqueous cobalt nitrate solution, 2.5 g of magnesium oxide (DENMAG® KMAOH-F produced by Tateho Chemical Industries Co., Ltd.) with a specific surface area of 0.61 $m^2/g$ was added and stirred for 1 hour in a state of being maintained at 50° C. in a water bath. After stirring, water was evaporated by an evaporator. The solid component thus produced was vacuum dried at 60° C. for 24 hours and then sintered at 400° C. for 5 hours. After sintering, the solid component thus produced was ground in an agate mortar to produce a cobalt-magnesium oxide supported catalyst on which 20 mass % of cobalt metal was supported.

Catalyst Preparation Example 4

Cobalt nitrate hexahydrate (3N5 produced by Kanto Chemical Co., Inc.) was weighed to 1.85 g and dissolved in 30 g of a mixed solvent of distilled water and ethanol at a mass ratio of 2:1. To the aqueous cobalt nitrate solution, 2.5 g of magnesium oxide (DENMAG® KMAOH-F produced by Tateho Chemical Industries Co., Ltd.) with a specific surface area of 0.61 $m^2/g$ was added and stirred for 1 hour in a state of being maintained at 50° C. in a water bath. After stirring, water was evaporated by an evaporator. The solid component thus produced was vacuum dried at 60° C. for 24 hours and then sintered at 400° C. for 5 hours. After sintering, the solid component thus produced was ground in an agate mortar to produce a cobalt-magnesium oxide supported catalyst on which 150 mass % of cobalt metal was supported.

Cobalt-Titanium Oxide Supported Catalyst

Catalyst Preparation Example 5

In 30 mL of distilled water, 2.5 g of titanium oxide (AEROXIDE® "$TiO_2$ P25" produced by Nippon Aerosil Co., Ltd., with a specific surface area of 52 $m^2/g$) with a ratio of the anatase structure to the rutile structure of 80 to 20 and 0.62 g of cobalt nitrate hexahydrate (3N5 produced by Kanto Chemical Co., Inc.) were dissolved. The solution was set in a rotary evaporator (N1000 manufactured by Tokyo Rikakikai Co., Ltd.) and heated to 50° C. in a water bath and stirred for 1 hour. After removal of water, it was further dried in vacuum at 60° C. for 12 hours to produce a solid component.

The solid component thus produced was put in a ceramic crucible and sintered in a muffle furnace (FO200 manufactured by Yamato Scientific Co., Ltd.) in conditions of 400° C. in air for 5 hours to produce a cobalt-titanium oxide supported catalyst with a cobalt support ratio of 5%.

Catalyst Preparation Example 6

In accordance with Japanese Patent No. 5003923, a catalyst was prepared as follows. In 25 mL of ion exchange water, 5.75 g (0.02 mol) of cobalt nitrate [$Co(NO_3)_2 \cdot 6H_2O$, molecular weight of 291.03] and 5.10 g (0.02 mol) of magnesium nitrate [$Mg(NO_3)_2 \cdot 6H_2O$, molecular weight of 256.41] were dissolved to prepare a raw material solution (1). In addition, in 55 mL of ion exchange water, 11 g (0.139 mol) of ammonium bicarbonate [$(NH_4)HCO_3$, molecular weight of 79.06] powder was dissolved to prepare a raw material solution (2). Then, the raw material solutions (1) and (2) were mixed at a reaction temperature of 40° C. and then stirred for 4 hours. The precipitate thus produced was filtered and washed and then dried. After sintered, it was ground in a mortar to obtain 2.48 g of a catalyst.

As a raw material, carbon monoxide of grade G1 (99.95% purity) purchased from Suzuki Shokan Co., Ltd. was used.

Production of CNF-A

A rotary synthesis reactor was charged with 0.62 g of the cobalt-magnesium oxide supported catalyst (0.25 g of active species) prepared in Catalyst Preparation Example 1 and 0.19 g of the fluid material, while purged with nitrogen by sufficient flow of nitrogen, the reactor was rotated at a rotation speed of 30 rpm at atmospheric pressure (0.101 MPa) to start raising the temperature. When the temperature reached 600° C., the gas flow was switched to a reducing gas of 80% nitrogen and 20% hydrogen to raise the temperature to 650° C. for approximately 20 min. After reaching 650° C., a raw material gas with a carbon monoxide gas partial pressure of 0.086 MPa and a hydrogen gas partial pressure of 0.015 MPa was flown through a catalyst layer at a carbon monoxide gas flow rate of 3.9 NL/g-active species·min. for reaction for 1 hour. The raw material gas was then switched to a nitrogen gas to be cooled immediately. Approximately 4.4 g of CNF was produced. In the description below, the CNF produced in the present production conditions is referred to as CNF-A.

Production of CNF-B

CNF was synthesized by the same method as the production of CNF-A other than changing the reaction temperature to 720° C. Approximately 3.5 g of CNF was produced. In the description below, the CNF produced in the present production conditions is referred to as CNF-B.

Production of CNF-C

In a fixed synthesis reactor, a catalyst holder was provided that was charged with the cobalt-magnesium oxide supported catalyst prepared in Catalyst Preparation Example 1 with an active species content of 5 mg and the reactor was purged with nitrogen by sufficient flow of nitrogen. Further, a reducing gas of 80% nitrogen and 20% hydrogen was raised to a temperature of 680° C. at atmospheric pressure (0.101 MPa), and after the temperature reached 680° C., the gas was maintained for 30 min. for catalyst reduction. Subsequently, a raw material gas with a carbon monoxide gas partial pressure of 0.086 MPa and a hydrogen gas partial pressure of 0.015 MPa was flown through a catalyst layer at a carbon monoxide gas flow rate of 13 NL/g-active species·min. for reaction for 1 hour. The raw material gas was then switched to a nitrogen gas to be cooled immediately. In the description below, the CNF produced in the present production conditions is referred to as CNF-C.

Production of CNF-D

In a fixed synthesis reactor, a catalyst holder was provided that was charged with the cobalt-magnesium oxide supported catalyst prepared in Catalyst Preparation Example 1 with an active species content of 5 mg and the reactor was purged with nitrogen by sufficient flow of nitrogen. Further, a reducing gas of 80% nitrogen and 20% hydrogen was raised to a temperature of 700° C. at atmospheric pressure (0.101 MPa), and after the temperature reached 700° C., the gas was maintained for 30 min. for catalyst reduction. Subsequently, a raw material gas with a carbon monoxide gas partial pressure of 0.090 MPa and a hydrogen gas partial pressure of 0.010 MPa was flown through a catalyst layer at a carbon monoxide gas flow rate of 66 NL/g-active species·min. for reaction for 1 hour. The raw material gas was then switched to a nitrogen gas to be cooled immediately. In the description below, the CNF produced in the present production conditions is referred to as CNF-D.

Production of CNF-E

In a fixed synthesis reactor, a catalyst holder was provided that was charged with the cobalt-magnesium oxide supported catalyst prepared in Catalyst Preparation Example 1 with an active species content of 5 mg and the reactor was purged with nitrogen by sufficient flow of nitrogen. Further, a reducing gas of 80% nitrogen and 20% hydrogen was raised to a temperature of 700° C. at atmospheric pressure (0.101 MPa), and after the temperature reached 700° C., the gas was maintained for 30 min. for catalyst reduction. Subsequently, a raw material gas with a carbon monoxide gas partial pressure of 0.086 MPa and a hydrogen gas partial pressure of 0.015 MPa was flown through a catalyst layer at a carbon monoxide gas flow rate of 66 NL/g-active species·min. for reaction for 1 hour. The raw material gas was then switched to a nitrogen gas to be cooled immediately. In the description below, the CNF produced in the present production conditions is referred to as CNF-E.

Production of CNF-F

In a fixed synthesis reactor, a catalyst holder was provided that was charged with the cobalt-magnesium oxide supported catalyst prepared in Catalyst Preparation Example 2 with an active species content of 5 mg and the reactor was purged with nitrogen by sufficient flow of nitrogen. Further, a reducing gas of 80% nitrogen and 20% hydrogen was raised to a temperature of 680° C. at atmospheric pressure (0.101 MPa), and after the temperature reached 680° C., the gas was maintained for 30 min. for catalyst reduction. Subsequently, a raw material gas with a carbon monoxide gas partial pressure of 0.1 MPa was flown through a catalyst layer at a carbon monoxide gas flow rate of 66 NL/g-active species·min. for reaction for 1 hour. The raw material gas was then switched to a nitrogen gas to be cooled immediately. In the description below, the CNF produced in the present production conditions is referred to as CNF-F.

Production of CNF-G

In a fixed synthesis reactor, a catalyst holder was provided that was charged with the cobalt-magnesium oxide supported catalyst prepared in Catalyst Preparation Example 2 with an active species content of 5 mg and the reactor was purged with nitrogen by sufficient flow of nitrogen. Further, a reducing gas of 80% nitrogen and 20% hydrogen was raised to a temperature of 680° C. at atmospheric pressure (0.101 MPa), and after the temperature reached 680° C., the gas was maintained for 30 min. for catalyst reduction. Subsequently, a raw material gas with a carbon monoxide gas partial pressure of 0.086 MPa and a hydrogen gas partial pressure of 0.015 MPa was flown through a catalyst layer at a carbon monoxide gas flow rate of 66 NL/g-active species·min. for reaction for 1 hour. The raw material gas was then switched to a nitrogen gas to be cooled immediately. In the description below, the CNF produced in the present production conditions is referred to as CNF-G.

Production of CNF-H

CNF-H was synthesized by the same method as the production of CNF-G other than using the catalyst prepared in Catalyst Preparation Example 3. In the description below, the CNF produced in the present production conditions is referred to as CNF-H.

Production of CNF-I

CNF-I was synthesized by the same method as the production of CNF-H other than using the catalyst prepared in Catalyst Preparation Example 4. In the description below, the CNF produced in the present production conditions is referred to as CNF-I.

Production of CNF-J

CNF-J was synthesized by the same method as the production of CNF-F other than using the catalyst prepared in Catalyst Preparation Example 5. In the description below, the CNF produced in the present production conditions is referred to as CNF-J.

Production of CNF-K

In a fixed synthesis reactor, a catalyst holder was provided that was charged with the catalyst prepared in Catalyst Preparation Example 6 with an active species content of 5 mg and the reactor was purged with nitrogen by sufficient flow of nitrogen. Further, a reducing gas of 80% nitrogen and 20% hydrogen was raised to a temperature of 700° C. at atmospheric pressure (0.101 MPa), and after the temperature reached 700° C., the gas was maintained for 30 min. for catalyst reduction. Subsequently, a raw material gas with a carbon monoxide gas partial pressure of 0.086 MPa and a hydrogen gas partial pressure of 0.015 MPa was flown through a catalyst layer at a carbon monoxide gas flow rate of 13 NL/g-active species·min. for reaction for 1 hour. The raw material gas was then switched to a nitrogen gas to be cooled immediately. In the description below, the CNF produced in the present production conditions is referred to as CNF-K.

Table 1 shows the reactor, the catalyst, the reaction temperature, the raw material gas composition, the carbon monoxide gas partial pressure, the carbon monoxide gas flow rate, and reaction time that were employed for synthesis of each CNF. Table 2 shows the powder resistivity, the D/G, the specific surface area, the fiber diameter, the ratio of particles with a particle size of 1 μm or less (volume %), and the median diameter D50 value of each CNF and carbon black.

Tables 3 and 4 show the formula, the number of revolutions for kneading, and the kneading temperature in each of Examples and Comparative Examples. In accordance with the formulation, a thermoplastic polymer material and a conductive filler were melt kneaded to produce a thermoplastic conductive polymer material. As the thermoplastic polymer material, polystyrene (G200C produced by Toyo Styrene Co., Ltd.), polypropylene (J106G produced by Prime Polymer Co., Ltd.), and polycarbonate (AD5503 produced by Teijin Ltd.) were used. Labo Plastomill p (manufactured by Toyo Seiki Seisaku-sho, Ltd.) was used as a kneader, and a compact segment mixer KF6 (manufactured by Toyo Seiki Seisaku-sho, Ltd., capacity of 6 cm$^3$) was used for the mixer unit. Kneading was performed in conditions of a temperature 220° C.-270° C., the number of revolutions of 15-30 rpm, and kneading time of 10 min. After kneading, the conductive polymer material was heat pressed at the same temperature as that for kneading in conditions of 10 kgf/cm$^2$ for 5 min. and then 100 kg/cm$^2$ for 10 min. to produce a flat plate of the conductive polymer material with a diameter of 20 mm and a thickness of 1 mm. For the volume resistivity measurement of the flat plate, Loresta GP manufactured by Mitsubishi Chemical Analytech Co., Ltd. was used and an ESP probe was used as the probe. The volume resistivity measurement was carried out in conditions of 23° C. and relative humidity of 50%. Volume resistivity measurement results are shown in Tables 3 and 4.

TABLE 1

|  | Reactor | Catalyst Preparation Example | Synthesis Temp (° C.) | Raw Material Gas Composition H$_2$/CO | CO Partial Pressure (MPa) | CO Flow Rate (NL/g-active species · min.) | Reaction Time (min) |
| --- | --- | --- | --- | --- | --- | --- | --- |
| CNF-A | Rotary | 1 | 650 | 15/85 | 0.086 | 3.9 | 60 |
| CNF-B | Rotary | 1 | 720 | 17/83 | 0.086 | 3.9 | 60 |
| CNF-C | Fixed | 1 | 680 | 15/85 | 0.086 | 13 | 60 |
| CNF-D | Fixed | 1 | 700 | 10/90 | 0.09 | 62 | 60 |
| CNF-E | Fixed | 1 | 700 | 15/85 | 0.086 | 67 | 60 |
| CNF-F | Fixed | 2 | 700 | 0/100 | 0.1 | 66 | 60 |
| CNF-G | Fixed | 2 | 700 | 15/85 | 0.086 | 62 | 60 |
| CNF-H | Fixed | 3 | 700 | 15/85 | 0.086 | 62 | 60 |
| CNF-I | Fixed | 4 | 700 | 15/85 | 0.086 | 62 | 60 |
| CNF-J | Fixed | 5 | 700 | 0/100 | 0.1 | 66 | 60 |
| CNF-K | Fixed | 6 | 700 | 15/85 | 0.086 | 13 | 60 |

TABLE 2

| Type of Conductive Filler | Powder Resistivity [Ω·cm] | D/G | Specific Surface Area [m²/g] | Average Fiber Diameter [nm] | Ratio of Particles with Particle Size of 1 μm or Less [volume %] | Median Diameter D50 [μm] |
|---|---|---|---|---|---|---|
| CNF-A | 0.015 | 0.7 | 156 | 15 | 70 | 0.5 |
| CNF-B | 0.016 | 0.7 | 113 | 20 | 84 | 0.3 |
| CNF-C | 0.025 | 0.7 | 92 | 23 | 80 | 0.5 |
| CNF-D | 0.019 | 0.9 | 111 | 21 | 100 | 0.3 |
| CNF-E | 0.019 | 0.9 | 128 | 18 | 100 | 0.3 |
| CNF-F | 0.029 | 0.9 | 107 | 22 | 71 | 0.5 |
| CNF-G | 0.028 | 1.2 | 146 | 16 | 80 | 0.7 |
| CNF-H | 0.018 | 0.9 | 122 | 19 | 100 | 0.3 |
| CNF-I | 0.020 | 0.9 | 129 | 18 | 100 | 0.3 |
| CNF-J | 0.017 | 0.9 | 91 | 26 | 85 | 0.2 |
| CNF-K | 0.032 | 1.7 | 261 | 9 | 32 | 10 |
| Flotube9000 | 0.023 | 1.7 | 241 | 9 | 9 | 42 |
| NC7000 | 0.025 | 1.8 | 220 | 11 | 7 | 23 |
| Carbon Black-A | 0.088 | 1.7 | 133 | — | 100 | 0.3 |
| Carbon Black-B | 0.063 | 2.4 | 39 | — | 100 | 0.3 |

TABLE 3

| Examples | Type of Conductive Filler | Type of Resin | Number of Revolutions [rpm] | Kneading Temp [°C] | Amount of Conductive Filler [mass %] | Amount of Resin [mass %] | Volume Resistivity [Ω·cm] |
|---|---|---|---|---|---|---|---|
| Example 1 | CNF-A | G200C | 30 | 220 | 5 | 95 | 7 |
| Example 2 | CNF-A | G200C | 30 | 250 | 1 | 99 | $3.1 \times 10^3$ |
| Example 3 | CNF-A | G200C | 30 | 250 | 5 | 95 | 5 |
| Example 4 | CNF-A | G200C | 30 | 250 | 10 | 90 | 4 |
| Example 5 | CNF-A | J106G | 30 | 220 | 1.5 | 98.5 | $3.5 \times 10^3$ |
| Example 6 | CNF-A | J106G | 30 | 220 | 3 | 97 | 90 |
| Example 7 | CNF-A | J106G | 30 | 220 | 5 | 95 | 5 |
| Example 8 | CNF-A | AD5503 | 30 | 270 | 1.5 | 98.5 | $1.0 \times 10^2$ |
| Example 9 | CNF-B | G200C | 30 | 220 | 1.5 | 98.5 | $2.3 \times 10^3$ |
| Example 10 | CNF-C | G200C | 30 | 220 | 1.5 | 98.5 | $2.2 \times 10^3$ |
| Example 11 | CNF-C | G200C | 30 | 220 | 5 | 95 | $1.2 \times 10^1$ |
| Example 12 | CNF-C | G200C | 30 | 220 | 1 | 99 | $8.9 \times 10^6$ |
| Example 13 | CNF-D | J106G | 30 | 220 | 1.5 | 98.5 | $2.5 \times 10^3$ |
| Example 14 | CNF-E | J106G | 30 | 220 | 1.5 | 98.5 | $4.0 \times 10^3$ |
| Example 15 | CNF-F | J106G | 30 | 220 | 1.5 | 98.5 | $1.8 \times 10^4$ |
| Example 16 | CNF-G | J106G | 30 | 220 | 1.5 | 98.5 | $2.0 \times 10^4$ |
| Example 17 | CNF-H | J106G | 30 | 220 | 1.5 | 98.5 | $7.3 \times 10^3$ |
| Example 18 | CNF-I | J106G | 30 | 220 | 1.5 | 98.5 | $2.5 \times 10^2$ |
| Example 19 | CNF-J | J106G | 30 | 220 | 1.5 | 98.5 | $4.3 \times 10^3$ |
| Example 20 | CNF-A | J106G | 15 | 220 | 1.5 | 98.5 | $2.0 \times 10^4$ |

TABLE 4

| Comparative Example | Type of Conductive Filler | Type of Resin | Number of Revolutions [rpm] | Kneading Temp [°C] | Amount of Conductive Filler [mass %] | Amount of Resin [mass %] | Volume Resistivity [Ω·cm] |
|---|---|---|---|---|---|---|---|
| Comparative Example 1 | CNF-K | G200C | 30 | 220 | 1.5 | 98.5 | $10^7$ or more |
| Comparative Example 2 | Flotube9000 | G200C | 30 | 220 | 1.5 | 98.5 | $10^7$ or more |
| Comparative Example 3 | Flotube9000 | G200C | 30 | 220 | 5 | 95 | $10^7$ or more |
| Comparative Example 4 | Flotube9000 | J106G | 30 | 220 | 1.5 | 98.5 | $10^7$ or more |
| Comparative Example 5 | Carbon Black-A | G200C | 30 | 220 | 5 | 95 | $10^7$ or more |
| Comparative Example 6 | Carbon Black-B | G200C | 30 | 220 | 5 | 95 | $10^7$ or more |

Example 1

CNF-A was used as a conductive filler and melt kneaded at 220° C. A conductive polymer material of 5 mass % of CNF-A and 95 mass % of G200C was produced. A result of volume resistivity measurement is shown in Table 3.

Example 2

CNF-A was used as a conductive filler and melt kneaded at 250° C. A conductive polymer material of 1 mass % of CNF-A and 99 mass % of G200C was produced. A result of volume resistivity measurement is shown in Table 3.

Example 3

CNF-A was used as a conductive filler and melt kneaded at 250° C. A conductive polymer material of 5 mass % of CNF-A and 95 mass % of G200C was produced. A result of volume resistivity measurement is shown in Table 3.

Example 4

CNF-A was used as a conductive filler and melt kneaded at 250° C. A conductive polymer material of 10 mass % of CNF-A and 90 mass % of G200C was produced. A result of volume resistivity measurement is shown in Table 3.

Example 5

CNF-A was used as a conductive filler and melt kneaded at 220° C. A conductive polymer material of 1.5 mass % of CNF-A and 98.5 mass % of J106G was produced. A result of volume resistivity measurement is shown in Table 3.

Example 6

CNF-A was used as a conductive filler and melt kneaded at 220° C. A conductive polymer material of 3 mass % of CNF-A and 97 mass % of J106G was produced. A result of volume resistivity measurement is shown in Table 3.

Example 7

CNF-A was used as a conductive filler and melt kneaded at 220° C. A conductive polymer material of 5 mass % of CNF-A and 95 mass % of J106G was produced. A result of volume resistivity measurement is shown in Table 3.

Example 8

CNF-A was used as a conductive filler and melt kneaded at 270° C. A conductive polymer material of 1.5 mass % of CNF-A and 98.5 mass % of AD5503 was produced. A result of volume resistivity measurement is shown in Table 3.

Example 9

CNF-B was used as a conductive filler and melt kneaded at 220° C. A conductive polymer material of 1.5 mass % of CNF-B and 98.5 mass % of G200C was produced. A result of volume resistivity measurement is shown in Table 3.

Example 10

CNF-C was used as a conductive filler and melt kneaded at 220° C. A conductive polymer material of 1.5 mass % of CNF-C and 98.5 mass % of G200C was produced. A result of volume resistivity measurement is shown in Table 3.

Example 11

CNF-C was used as a conductive filler and melt kneaded at 220° C. A conductive polymer material of 5 mass % of CNF-C and 95 mass % of G200C was produced. A result of volume resistivity measurement is shown in Table 3.

Example 12

CNF-C was used as a conductive filler and melt kneaded at 220° C. A conductive polymer material of 1 mass % of CNF-C and 99 mass % of G200C was produced. A result of volume resistivity measurement is shown in Table 3.

Example 13

CNF-D was used as a conductive filler and melt kneaded at 220° C. A conductive polymer material of 1.5 mass % of CNF-D and 98.5 mass % of J106G was produced. A result of volume resistivity measurement is shown in Table 3.

Example 14

CNF-E was used as a conductive filler and melt kneaded at 220° C. A conductive polymer material of 1.5 mass % of CNF-E and 98.5 mass % of J106G was produced. A result of volume resistivity measurement is shown in Table 3.

Example 15

CNF-F was used as a conductive filler and melt kneaded at 220° C. A conductive polymer material of 1.5 mass % of CNF-F and 98.5 mass % of J106G was produced. A result of volume resistivity measurement is shown in Table 3.

Example 16

CNF-G was used as a conductive filler and melt kneaded at 220° C. A conductive polymer material of 1.5 mass % of CNF-G and 98.5 mass % of J106G was produced. A result of volume resistivity measurement is shown in Table 3.

Example 17

CNF-H was used as a conductive filler and melt kneaded at 220° C. A conductive polymer material of 1.5 mass % of CNF-H and 98.5 mass % of J106G was produced. A result of volume resistivity measurement is shown in Table 3.

Example 18

CNF-I was used as a conductive filler and melt kneaded at 220° C. A conductive polymer material of 1.5 mass % of CNF-I and 98.5 mass % of J106G was produced. A result of volume resistivity measurement is shown in Table 3.

Example 19

CNF-J was used as a conductive filler and melt kneaded at 220° C. A conductive polymer material of 1.5 mass % of CNF-J and 98.5 mass % of J106G was produced. A result of volume resistivity measurement is shown in Table 3.

Example 20

CNF-A was used as a conductive filler and melt kneaded at the number of revolutions for kneading of 15 rpm and at 220° C. A conductive polymer material of 1.5 mass % of CNF-A and 98.5 mass % of J106G was produced. A result of volume resistivity measurement is shown in Table 3.

Comparative Example 1

CNF-K with a median diameter D50 value of 10 and powder resistivity and D/G of 1.7 was used as a conductive filler and melt kneaded at 220° C. A conductive polymer material of 1.5 mass % of CNF-K and 98.5 mass % of G200C was produced. A result of volume resistivity measurement is shown in Table 4. The volume resistivity was $10^7$ Ωcm or more.

Comparative Example 2

Flotube9000 (produced by Cnano Technology Ltd.) with a median diameter D50 value of 42 and powder resistivity and D/G of 1.7 was used as a conductive filler and melt kneaded at 220° C. A conductive polymer material of 1.5 mass % of Flotube9000 and 98.5 mass % of G200C was produced. A result of volume resistivity measurement is shown in Table 4. The volume resistivity was $10^7$ Ωcm or more.

Comparative Example 3

Flotube9000 (produced by Cnano Technology Ltd.) with a median diameter D50 value of 42 and powder resistivity and D/G of 1.7 was used as a conductive filler and melt kneaded at 220° C. A conductive polymer material of 5 mass % of Flotube9000 and 95 mass % of G200C was produced. A result of volume resistivity measurement is shown in Table 4. The volume resistivity was $10^7$ Ωcm or more.

Comparative Example 4

Flotube9000 (produced by Cnano Technology Ltd.) with a median diameter D50 value of 42 and powder resistivity and D/G of 1.7 was used as a conductive filler and melt kneaded at 220° C. A conductive polymer material of 1.5 mass % of Flotube9000 and 98.5 mass % of J106G was produced. A result of volume resistivity measurement is shown in Table 4. The volume resistivity was $10^7$ Ωcm or more.

Comparative Example 5

Commercially available carbon black-A with powder resistivity and D/G of 1.7 (specific surface area of 133 m$^2$/g and DBP oil absorption of 267 mL/100 g) was used as a conductive filler and melt kneaded at 220° C. A conductive polymer material of 5 mass % of carbon black-A and 95 mass % of G200C was produced. A result of volume resistivity measurement is shown in Table 4. The volume resistivity was $10^7$ Ωcm or more.

Comparative Example 6

Commercially available carbon black-B with powder resistivity and D/G of 2.4 (specific surface area of 39 m$^2$/g and DBP oil absorption of 177 mL/100 g) was used as a conductive filler and melt kneaded at 220° C. A conductive polymer material of 5 mass % of carbon black-B and 95 mass % of G200C was produced. A result of volume resistivity measurement is shown in Table 4. The volume resistivity was $10^7$ Ωcm or more.

Example 21

Preparation of Conductive Rubber Composition

CNF-A was used as a conductive filler and Vistalon 6505EPDM (produced by Exxon Mobil Corp.) was used as rubber (raw rubber) and they were compounded in accordance with the following method and then cured. In a plastic container, 100 parts by mass of carbon black N550 (available from Cabot Corporation), 50 parts by mass of PW-100 oil (produced by Idemitsu Kosan Co., Ltd.), 5 parts by mass of paraffin wax, 1 part by mass of stearic acid, 5 parts by mass of zinc oxide, 1.5 parts by mass of sulfur, and 0.5 parts by mass of Captax 2-mercaptobenzothiazol (produced by R.T. Vanderbilt Company, Inc.) were premixed. Preheating at 50° C. using a Brabender Plasti-Corder (PL2000 manufactured by Brabender GmbH & Co KG), a blend thus produced was introduced into a bowl of 45 cm$^3$. In the bowl, 100 parts by mass of raw rubber and 2.5 parts by mass of CNF-A were further added. The mixture was then mixed at 100 rpm for 4 min. until reaching 100° C. The mixture was taken out of the mixer further for roll milling. The uncured sample thus produced was compression molded at 130° C. to produce an uncured (green) sheet (thickness of 1 mm). This sheet was compression molded at 180° C. for 20 min. and cured to produce crosslinked rubber (CNF content of 1.9 mass %). The volume resistivity was $1\times10^4$ Ωcm.

As seen from Examples 1 and 11, when the CNFs according to the present invention were used, conductive polymer materials were obtained that had a lower volume resistivity compared with Comparative Example 3. This is considered to be caused by the differences in dispersibility of CNF and conductivity. That is, the CNFs used in the Examples had excellent dispersibility and conductivity, and thus readily formed an excellent conductive network in the polymer.

As seen from Examples 1 and 11, when the CNFs according to the present invention were used, conductive polymer materials were obtained that had lower volume resistivities compared with Comparative Examples 5 and 6 using carbon black A and B. This is considered to be caused by the difference in conductivity of the conductive fillers used therein. It is also understood that the CNFs in the Examples had high performance to give conductivity to the polymer material.

As seen from Example 5, when the CNF according to the present invention was used, a conductive polymer material was obtained that had a lower volume resistivity compared with Comparative Example 4. This is considered to be caused by the differences in dispersibility and conductivity of the CNFs used therein. That is, the CNF used in this Example had excellent dispersibility and conductivity, and thus readily formed an excellent conductive network in the polymer.

As seen from Examples 9 and 10, when the CNFs according to the present invention were used, conductive polymer materials were produced that had a lower volume resistivity compared with Comparative Examples 1 and 2. This is considered to be caused by the differences in dispersibility and conductivity of the CNFs used therein. That is, the CNFs used in the Examples had excellent dispersibility and conductivity, and thus readily formed an excellent conductive network in the polymer.

As seen from Examples 13 to 19, when the CNFs according to the present invention were used, conductive polymer materials were produced that had a lower volume resistivity compared with Comparative Example 4. This is considered to be caused by the differences in dispersibility and conductivity of the CNFs used therein. That is, the CNFs used in the Examples had excellent dispersibility and conductivity, and thus readily formed an excellent conductive network in the polymer. In Example 20, even though the number of revolutions during kneading was as low as 15 rpm, a conductive polymer material with a low volume resistivity was produced and therefore considered to have excellent dispersibility.

INDUSTRIAL APPLICABILITY

The thermoplastic conductive polymer material of the present invention has high conductivity and thus considered to be applied to, for example, antistatic materials, heating elements, electromagnetic wave shielding materials, conductive coating, containers for electrical and electronic devices, conductive sliding parts, battery electrode plates, conductive materials replacing metal wirings, and the like.

The invention claimed is:

1. A conductive polymer material, comprising: carbon nanofiber with a median diameter D50 value from 0.1 to 8 µm; and a polymer material, wherein a content of the carbon nanofiber is from 0.1 to 30 mass % and wherein a ratio of the content of the carbon nanofiber to a content of polymer material is from 1/99 to 10/90, and the carbon nanofiber further has D/G from 0.5 to 1.3.

2. The conductive polymer material of claim 1, wherein the carbon nanofiber further has powder resistivity of 0.03 $\Omega$cm or less, measured under a load of 9.8 MPa.

3. The conductive polymer material of claim 1, wherein the carbon nanofiber has a median diameter D50 value from 0.1 to 3 µm.

4. The conductive polymer material of claim 1, wherein the polymer material is any one or more of thermoplastic resins selected from a polystyrene resin, a polyvinyl alcohol resin, an acrylonitrile-butadiene-styrene resin, a polyacetal resin, a polymethyl methacrylate resin, a polyethylene terephthalate resin, a polycarbonate resin, a polyamide resin, a polyphenylene ether resin, a polyvinyl chloride resin, a polybutylene terephthalate resin, a polyphenylene sulfide resin, and a polyetheretherketone resin.

5. The conductive polymer material of claim 4, wherein a ratio of the content of the carbon nanofiber to a content of polymer material is from 1/95 to 10/90.

6. The conductive polymer material of claim 1, wherein the polymer material is any one or more of rubbers selected from chloroprene rubber, silicone rubber, ethylene-propylene rubber, nitrile rubber, urethane rubber, epichlorohydrin rubber, and fluorocarbon rubber.

7. The conductive polymer material of claim 6, wherein a ratio of the content of the carbon nanofiber to a content of polymer material is from 1/95 to 10/90.

8. The conductive polymer material of claim 1, wherein the carbon nanofiber is carbon nanofiber produced using a catalyst having an active species containing cobalt as a main component from 3 to 150 mass % supported on a carrier of a magnesium-containing oxide with a specific surface area from 0.01 to 5 $m^2/g$.

9. The conductive polymer material of claim 8, wherein the carbon nanofiber is carbon nanofiber produced using the catalyst in conditions of a carbon source of carbon monoxide, a reaction temperature from 600° C. to 800° C., a carbon monoxide partial pressure from 0.04 to 0.98 MPa, a hydrogen partial pressure from 1% to 100% based on the carbon monoxide partial pressure, and a carbon monoxide gas flow rate of 1 NL/g-active species min. or more.

10. The conductive polymer material of claim 1, wherein the carbon nanofiber is carbon nanofiber produced using a catalyst having an active species containing cobalt as a main component supported on a carrier of a titanium-containing oxide with a specific surface area from 20 to 140 $m^2/g$.

11. The conductive polymer material of claim 1, wherein the carbon nanofiber is carbon nanofiber produced using a catalyst having an active species containing iron and nickel as main components supported on a graphite particle carrier with a specific surface area from 0.01 to 200 $m^2/g$.

12. The conductive polymer material of claim 1, wherein the carbon nanofiber is carbon nanofiber produced using the catalyst of claim 10 in conditions of a carbon source of carbon monoxide, a reaction temperature from 550° C. to 650° C., a carbon monoxide partial pressure from 0.04 to 0.98 MPa, a hydrogen partial pressure from 1% to 100% based on the carbon monoxide partial pressure, and a carbon monoxide gas flow rate of 1 NL/g-active species min. or more.

13. A shaped article, comprising the conductive polymer material of claim 1.

14. The conductive polymer material of claim 1, wherein a ratio of the content of the carbon nanofiber to a content of polymer material is from 1/95 to 10/90.

* * * * *